United States Patent [19]

Veldman et al.

[11] Patent Number: 5,686,016
[45] Date of Patent: Nov. 11, 1997

[54] OXYGEN SCAVENGING SOLUTIONS FOR REDUCING CORROSION BY HEAT STABLE AMINE SALTS

[76] Inventors: Ray R. Veldman, 7710 Meadowbriar, Houston, Tex. 77063; David Trahan, 304 Oak Brook Blvd., Lafayette, La. 70508

[21] Appl. No.: 541,435

[22] Filed: Oct. 10, 1995

[51] Int. Cl.$^6$ .............................. C09K 15/00; C10G 19/00
[52] U.S. Cl. ................. 252/188.28; 252/390; 252/394; 208/47; 208/48 AA; 422/7; 422/13
[58] Field of Search .............................. 252/188.28, 390, 252/394; 422/12, 9, 7, 13; 208/47, 48 AA

[56] References Cited

U.S. PATENT DOCUMENTS

| | | | |
|---|---|---|---|
| 3,779,905 | 12/1973 | Stedman | 208/348 |
| 3,854,959 | 12/1974 | Costain et al. | 106/14 |
| 4,399,098 | 8/1983 | Cuisia | 422/13 |
| 4,487,745 | 12/1984 | Weiss et al. | 422/16 |
| 4,541,932 | 9/1985 | Muccitelli | 210/750 |
| 4,626,411 | 12/1986 | Nemes et al. | 422/13 |
| 4,980,128 | 12/1990 | Cuisia et al. | 422/16 |
| 5,173,213 | 12/1992 | Miller et al. | 252/394 |
| 5,178,796 | 1/1993 | Gewanter et al. | 252/389.53 |
| 5,258,125 | 11/1993 | Kelley et al. | 210/750 |
| 5,527,447 | 6/1996 | Roof | 208/48 AA |
| 5,587,109 | 12/1996 | Greaves et al. | 252/392 |

FOREIGN PATENT DOCUMENTS 1013041  7/1987  Japan.

*Primary Examiner*—Sharon Gibson
*Assistant Examiner*—Deanna Baxam
*Attorney, Agent, or Firm*—Pravel, Hewitt, Kimball & Krieger

[57] ABSTRACT

The formation of amine or glycol degradation products in solutions used to remove acid gases or water from hydrocarbon or inert streams is reduced by adding to the solution an oxygen scavenger in which the effective component is an oxime of the formula:

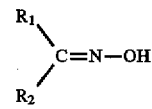

Mixed with a quinone promotor in which $R_1$ and $R_2$ are the same or different and are selected from hydrogen or lower alkyl groups of one to six carbon atoms. The addition of the quinone promotor increases the reactivity with oxygen at lower temperatures. The compound may also be as a corrosion inhibitor in gas treating or processing equipment.

14 Claims, No Drawings

OXYGEN SCAVENGING SOLUTIONS FOR REDUCING CORROSION BY HEAT STABLE AMINE SALTS

BACKGROUND OF THE INVENTION

1. Field of the Invention

The present invention relates to inhibiting the formation of corrosive amine or glycol consuming salts in gas or hydrocarbon solutions. More particularly, the present invention relates to scavenging the oxygen contaminate and changing the iron in contact with hydrocarbons and other solutions to a more corrosive resistant form by adding to the alkanolamine or glycol solution an oxime to react with the oxygen in the liquid.

2. General Background

Contaminants in crude hydrocarbons subjected to refining or purification operations include acids or acid-forming materials such as $CO_2$, $H_2S$, mercaptans, and sulfides. These acid-forming materials must be removed from the natural and cracked hydrocarbon or refined streams (which contain such hydrocarbons as methane, ethane, propane, etc. and olefins such as ethylene, propylene, butylene, etc.). One typically used method of removing the acids and acid-forming materials from hydrocarbon gases or liquids is by absorption in an amine regenerative solution absorbent unit. Regenerative amine solution units include columns with trays or other packing which are used to contact the aqueous alkanol amine solution with the hydrocarbon gases or liquids which contain the acids or acid-forming compounds. The amine solution can be regenerated by thermal stripping with steam to remove the acids or acid-forming compounds such as $H_2S$, $CO_2$, mercaptans and sulfides. This is accomplished in a regeneration section of the unit comprised of a column with trays or other packing in which the amine is contacted with steam, a reboiler in which the steam is formed, a reflux condenser and return system in which the steam is conserved, and other associated heat exchange equipment used for energy conservation or subsequent cooling of the amine prior to its return to the absorption section of the unit. Due to the presence of these acids and acid forming compounds, corrosion is often observed in the equipment containing the solutions.

A very troublesome acid-forming compound which is often found in feed gases and liquids to the amine solution unit including the makeup water is oxygen. The oxygen will dissolve into the amine solution, and as the amine is heated either from the exothemic reaction of the amine with acids such as $H_2S$ or $CO_2$ or from heat exchange equipment, the oxygen will react with the amine to form carboxylic acids such as formic, acetic, or oxalic acids. When $H_2S$ is present the oxygen may react with the $H_2S$ to form thiosulfate in the amine solution. These acids, being more acidic and more reactive than the $H_2S$, $CO_2$, mercaptans, or sulfides will then react with other amine molecules to form acid-amine salts which are not fully regenerated in the amine unit regeneration section. These are the so-called heat stable salts because unlike the amine salts formed from $H_2S$, and $CO_2$, they are not fully regenerated to amine and acid at the temperatures encountered in the regeneration section of the amine unit. However, at amine regeneration temperatures a resonance is established between the carboxylic acid and amine in which the two are paired as a non-corrosive soluble amine salt and as individual acid molecule and amine molecule. During the latter stage of this resonance the carboxylic acid will attach and corrode the metal in contact with the amine solution. The resulting corrosion has been observed in amine regeneration equipment.

As heat stable amine salts increase in concentration, the corrosiveness also increases. Amine consumption increases and unit efficiency decreases because a significant portion of the amine is reacted with the acids and, therefore, cannot act as an absorbent for the $H_2S$, $CO_2$, mercaptan, or sulfide removal. Additionally, the chemical characteristics of the amine changes because the carboxylic acids can react further to make even more stable amine degradation products. Similarly, oxygen can degrade glycols in glycol dehydration equipment or when glycols are used as heat exchange fluids.

SUMMARY OF THE PRESENT INVENTION

The present invention relates to the addition of oxygen scavengers to amine solutions primarily alkanolamine solutions, blends of different alkanolamine, and mixtures of alkanolamines with physical absorbants such as ethylene glycols, sulfolane, tetraglyme, or dimethyl ethers of polyethylene glycol. It also relates to the addition of the oxygen scavenger to glycols to prevent glycol degradation. The addition of the oxime results in a reduction in the formation of amine heat stable salts by complexing with dissolved oxygen before the oxygen can oxidize the amine or glycol to form a carboxylic acid or when $H_2S$ is present, a thiosulfate. Carboxylic acids such as formic, acetic, or oxalic acids, react with free amine or glycol to form non-regenerable acid-based salts and degradation products in the processing unit. These salts consume amine or glycol and result in corrosion to metals which are in contact with the solution. By addition of the oxime, non-regenerable salt formation is reduced, thereby reducing chemical consumption and corrosion to metals in contact with the treating solution. The oxime will also reduce the iron in contact with the solutions from the hydroxide $[Fe(OH)_2]$ or hematite $[Fe_2O_3]$ forms to the harder more corrosion resistant magnetite $[Fe_3O_4]$ form.

Therefore, it is the principal object of the present invention to inhibit the formation of corrosive amine or glycol consuming salts by adding to the alkanolamine solution an oxime of the formula

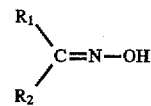

It is the further object of the present invention to provide that the addition of the oxime results in a reduction in the formation of amine heat stable salts or glycol degradation products by complexing with dissolved oxygen before the oxygen can oxidize the amine or glycol to form a carboxylic acid or when $H_2S$ is present, a thiosulfate;

It is a further object of the present invention to provide the addition of an oxime, so that non-regenerable salt formation which consume amine or glycol and result in corrosion of metals, is reduced, thereby reducing chemical consumption and corrosion to metals in contact with the treating solution.

It is a further object of the present invention to provide the addition of an oxime, so that the iron in contact with the treating solution is reduced to a more corrosion resistant form.

DETAILED DESCRIPTION OF THE PREFERRED EMBODIMENT

The invention is directed toward inhibiting the formation of these corrosive amine consuming salts by adding to the alkanolamine solution an oxime of the formula

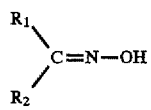

in which $R_1$ and $R_2$ are the same or different and are selected from hydrogen or lower alkyl groups of one to six carbon atoms. The oxime reacts with the oxygen which enters the treating system via the hydrocarbon gases or liquids or with makeup water. It reacts at lower temperatures with oxygen than the oxygen will react with the chemical. Since the oxygen contact with the amine first occurs at temperatures below oxidation thresholds, introducing the oxime to the solution allows the oxygen to react with the oxime first before amine oxidation occurs. The oxygen and oxime reaction products are $H_2O$, $N_2O$, and a ketone. These will be removed from the amine during regeneration or in the case of the ketone by filtration of the amine with activated carbon. These reaction products are not detrimental to amine or glycol unit operation. By reacting with the oxygen, first the oxime eliminates the formation of carboxylic acids and subsequent formation of the corresponding amine-acid salt. Additionally, the oxime reaction with oxygen can be catalyzed by the addition of a quinone such as hydroquinone to further lower the temperature at which the preferred reaction mechanism occurs.

The preferred embodiment of the invention relates to inhibiting the formation of these corrosive amine or glycol consuming salts and toward chemically changing the iron in contact with the hydrocarbons and solutions to a more corrosion resistant form by adding to the alkanolamine solution a oxime of the formula,

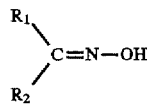

together with a promotor such as hydroquinone in which $R_1$ and $R_2$ are the same or different and are selected from hydrogen or lower alkyl groups of one to six carbon atoms. The oxime reacts with the oxygen which enters the treating equipment via the hydrocarbon gases or liquids or with makeup water. It reacts at lower temperatures with oxygen than the oxygen will react with the amine. Since the oxygen contact with the amine first occurs at temperatures below oxidation thresholds, introducing the oxime to the solution allows the oxygen to react with the oxime first before amine oxidation occurs. The oxygen and oxime reaction products are $H_2O$, $N_2O$, and a ketone. These will be removed from the amine or glycol during regeneration or in the case of the ketone by activated carbon. By reacting with the oxygen, first the oxime eliminates the formation of carboxylic acids and subsequent formation of the corresponding amine-acid salt or glycol-acid degradation product.

It is generally accepted that iron in contact with water reacts to form various oxides and hydroxides including but not limited to $Fe(OH)_2$, $Fe(OH)_3$, $Fe_2O_3$, and $Fe_3O_4$. The iron will also react with acid gases such as $H_2S$ and $CO_2$ to form sulfides and carbonates. The desired form of the iron for maximum corrosion protection is magnetite, $Fe_3O_4$. This form is harder, more impervious and also clings more securely to underlying iron. The promoted oxime reduces the other forms of iron to the magnetite. The promotor allows this reaction to occur at lower temperature similar to the scavenging of oxygen.

To demonstrate the effectiveness of the promoted oxime, aqueous solutions were prepared and then sparged with air for one minute. Results were as follows:

| TEMP °F. | INITIAL DISSOLVED OXYGEN CONTENT, PPM | DISSOLVED OXYGEN, PPM AFTER 1 (ONE) MINUTE |
|---|---|---|
| 1st Solution, 250 ml | | |
| 12 vol % methylethylketoxime, 16 vol % methanol, 72 vol % water | | |
| 100 | 9.5 | 9.5 |
| 120 | 9.3 | 8.1 |
| 140 | 9.6 | 8.8 |
| 160 | 7.6 | 7.6 |
| 180 | 10.4 | 9.8 |
| 2nd Solution, 250 ml | | |
| 12 vol % methylethylketoxime, | | |
| 2 vol % hydroquinone in 16 vol % methanol, 70 vol % water | | |
| 100 | 8.0 | 5.6 |
| 120 | 4.3 | 3.6 |
| 140 | 4.2 | 3.3 |
| 160 | 3.8 | 3.0 |
| 180 | 3.2 | 2.4 |

These results show that the addition of the quinone promotor results in the oxime reacting much more quickly with the oxygen and at lower temperatures.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of reducing the formation of amine salts, in an alkanolamine solution for treating light hydrocarbon or gas, wherein said amine salts are formed by the reaction of the solution with carboxylic acids or sulfates formed from reactions of the alkanolamine with oxygen or $H_2S$ with oxygen comprising reacting an oxime with the oxygen, in the presence of a quinone, by adding to the solution from 0.001 to 50,000 ppm an oxime of the formula

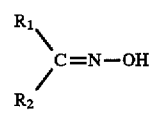

in which $R_1$ and $R_2$ are the same or different and are selected from hydrogen or lower alkyl groups of one to six carbon atoms.

2. The method in claim 1 wherein the oxime is selected from a group consisting of methylethylketoxime, acetaldoxime, butyraldoxime, and propionaldoxime.

3. The method according to claim 1 in which the oxime addition to said solution is monitored by relating the oxygen concentration in at least one of the hydrocarbon feed and makeup water to the oxime injection rate and dosage level.

4. The method according to claim 1 in which the oxime addition to said solution is monitored by relating dissolved oxygen content of the solution to the oxime injection rate and dosage level.

5. The method according to claim 1 in which the quinone is added to said solution in from 0.001 to 50,000 ppm concentration in conjunction with the oxime to improve the oxygen reaction with the oxime at lower temperatures.

6. The method according to claim 5 in which the quinone is hydroquinone.

7. The method according to claim 5 in which the oxime and quinone addition to the alkanolamine solution is monitored by relating the oxygen concentration in at least one of the hydrocarbon feed and makeup water to the oxime injection rate and dosage level.

8. The method according to claim 5 in which the oxime and quinone addition to the alkanolamine solution is monitored by relating dissolved oxygen content of the solution to the oxime and quinone injection rate and dosage level.

9. The method of claim 1 wherein the alkanolamine is selected from a group consisting of monoethanolamine, diethanolamine, methyldiethanolamine, triethanolamine, methlymonoethanolamine, and diglycolamine.

10. The method of claim 1 in which the alkanolamine is comprised of mixtures of two or more alkanolamines or an alkanolamine and a physical absorbent comprising piperzine or sulfolane.

11. The method of claim 8 in which the solution includes an alkanolamine comprised of mixture of the two or more alkanolamines or an alkanolamine and a physical absorbent comprising piperzine or sulfolane.

12. A method of removing reaction products of alkanolamine and oxygen in an amine solution for treating light hydrocarbons or gas by filtering the alkanolamine solution through activated carbon.

13. A method of removing reaction products of both oxime and quinone in an alkanolamine solution for treating light hydrocarbons or gas by filtering the alkanolamine solution through activated carbon.

14. A method according to claim 13 in which the alkanolamine solution passes in a stream through an amine regenerator reflux device, and the carbon filtration is performed on the amine regenerator reflux stream.

* * * * *